United States Patent
Liu et al.

(10) Patent No.: US 7,929,224 B2
(45) Date of Patent: Apr. 19, 2011

(54) OPTICAL ELEMENT AND MANUFACTURING METHOD THEREOF

(75) Inventors: Nan-Huang Liu, Cishan Township (TW); Zhen-Yu Hsu, Jhunan Township (TW); Chia-Lu Li, Hukou Shiang (TW)

(73) Assignee: Kinik Company, Taipei (TW)

( * ) Notice: Subject to any disclaimer, the term of this patent is extended or adjusted under 35 U.S.C. 154(b) by 102 days.

(21) Appl. No.: 12/435,174

(22) Filed: May 4, 2009

(65) Prior Publication Data
US 2010/0177409 A1    Jul. 15, 2010

(30) Foreign Application Priority Data
Jan. 14, 2009   (TW) ................ 98101290 A

(51) Int. Cl.
*G02B 7/02* (2006.01)
(52) U.S. Cl. .................. 359/811; 264/1.1; 264/2.4
(58) Field of Classification Search ............ 359/811
See application file for complete search history.

(56) References Cited

U.S. PATENT DOCUMENTS
2001/0053032 A1*   12/2001   Hatakeyama et al. ...... 359/819
* cited by examiner

*Primary Examiner* — Ricky L Mack
*Assistant Examiner* — James C Jones
(74) *Attorney, Agent, or Firm* — Tim Tingkang Xia; Morris, Manning & Martin, LLP

(57) ABSTRACT

An optical element and a manufacturing method thereof are described. An optical material is pressed in a holder through a mold, so as to form an optical element with an optical lens embedded in the holder. A groove in the holder has a guiding face, and the guiding face is obliquely disposed in a direction towards a mirror with a relatively smaller radius of curvature of the optical lens, so as to guide the optical material to truly enter the groove, thereby enhancing gas tightness and precision between the optical lens and the holder.

19 Claims, 4 Drawing Sheets

OPTICAL ELEMENT AND MANUFACTURING METHOD THEREOF

CROSS-REFERENCE TO RELATED APPLICATIONS

This non-provisional application claims priority under 35 U.S.C. §119(a) on Patent Application No(s). 098101290 filed in Taiwan, R.O.C. on Jan. 14, 2009 the entire contents of which are hereby incorporated by reference.

BACKGROUND OF THE INVENTION

1. Field of Invention

The present invention relates to an optical element, and more particularly to an optical element having a holder and an optical lens combined with each other, and a manufacturing method thereof.

2. Related Art

In various different fields, an optical element having an optical lens fixed in a holder is widely used in optical communication devices, optical data reading devices, and other types of optical devices.

In the conventional manufacturing technique of the optical element, an optical lens and a holder are respectively formed. After a layer of glass paste having a low melting point is coated on an edge of the optical lens, the optical lens is placed in the holder. Then, the holder accommodating the optical lens is heated, such that the optical lens is combined with the holder, so as to finish manufacturing the optical element. In the process of manufacturing the optical element, the optical lens and the holder are combined after being respectively produced, and thus when the optical lens and the holder are combined, it is difficult to master the matching degree, such that gas tightness between the optical lens and the holder is poor, and the optical lens easily falls off from the holder.

In addition, the glass paste used to combine the optical lens with the holder during the manufacturing process is mostly the toxic material containing lead, which not only hurts the operators, but also impacts the environment, such that the manufacturing cost of the optical element is increased.

In order to solve the problem, recently, a method of forming optical element by utilizing a pressing mold is developed. An optical material is pressed in the holder by the pressing mold, and an outer surface of the optical material is adhered to an inner surface of the holder, so as to form the holder having the fixed optical lens. Meanwhile, in order to prevent the optical lens falling off from the holder, the inner surface of the holder is disposed as an arc face depressed from two ends of the holder to the middle part. Alternatively, a groove is opened on the inner surface, such that the optical lens is fixed in the holder.

Although the mold pressing manner may enhance the holding strength between the optical lens and the holder. However, the lateral side of the optical lens combined with the holder is a smooth plane, such that the gas tightness between the two may be poor. During the process of using the mold pressing, it is usually difficult to evaluate the deformation amount of the optical lens during molding because of the calculation error of the used volume of the optical material, so the precision of the optical lens is affected, and the yield and the performance of the finished product of the optical element cannot be effectively improved.

In the manner of opening the groove on the inner surface of the holder to fix the optical lens, the problem that it is difficult to calculate the deformation amount of the optical material is slightly relieved. However, in the manner of disposing the groove, when the optical material is molded to the optical lens, the flowing characteristic of the optical material is not considered. Therefore, the groove only has the function of fixing the optical lens in the holder, and the gas tightness is poor as well.

SUMMARY OF THE INVENTION

In view of the above problems, the present invention is an optical element having a holder and an optical lens combined with each other, thereby alleviating the problems of the conventional art that the separately installed holder and the lens results in difficulty in control an eccentricity of the finished optical element, and difficulty in control deformation amount of the lens and an insufficient precision of the lens by reason of a calculation error of a used volume of the optical material, and solving the problem of the conventional art that in the optical element formed by using a pressing method, a gas tightness between the holder and the optical lens is still poor.

A method for manufacturing an optical element of the present invention comprises the steps as follows. A mold having a lower molding face and an upper molding face is provided, and a radius of curvature of the lower molding face is smaller than a radius of curvature of the upper molding face. Next, a holder having an outer surface, an inner surface, and at least one groove is provided, the groove surrounds the inner surface, and the groove has a guiding face and a carrying face. The guiding face is obliquely disposed in a direction from the lower molding face to the upper molding face and from the inner surface of the holder to the outer surface, and the carrying face is perpendicular to the inner surface, and forms an oblique angle with the guiding face. Then, an optical material is placed in the holder, and corresponds to a position of the groove.

Thereafter, the optical material is softened, and the optical material is pressed by the upper molding face and the lower molding face of the mold, such that the optical material is adhered to the inner surface of the holder, and is guided by the guiding face to be embedded in the groove. Meanwhile, the optical material is formed an optical lens having a first mirror and a second mirror, so as to finish the optical element having the holder and the optical lens combined with each other, in which the first mirror and the second mirror of the optical lens are respectively formed corresponding to the lower molding face and the upper molding face of the mold.

An optical element of the present invention comprises an optical lens and a holder. The optical lens has a first mirror and a second mirror, and a radius of curvature of the first mirror is smaller than a radius of curvature of the second mirror. The holder has an outer surface, an inner surface, and at least one groove surrounding the inner surface, the optical lens is adhered to the inner surface, embedded in the groove, and fixed in the holder. The groove of the holder has a guiding face and a carrying face, the guiding face is obliquely disposed in a direction from the first mirror to the second mirror and from the inner surface to the outer surface, and the carrying face is perpendicular to the inner surface, and forms an oblique angle with the guiding face.

In the optical element and the manufacturing method thereof of the present invention, through the disposing manner of the guiding face and the carrying face of the groove of the holder, when the optical material is formed the optical lens, the optical material is guided by the guiding face to be embedded in the groove, and is stopped on the carrying face, such that the formed optical lens is closely embedded in the holder, thereby enhancing the gas tightness between the two. Moreover, the disposing manner of the groove may prevent the overflow or the shortage of the optical material on the mold by reason of the calculation error of the used volume of the optical material when the optical material is pressed. Further, the optical lens is directly formed in the holder, such that the production and the assembly costs are further reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

An optical element of the present invention is a lens used in an optical device such as a laser diode, a photodiode, an optic fiber, a digital camera, and a compact disk (CD) player.

Figure 1:
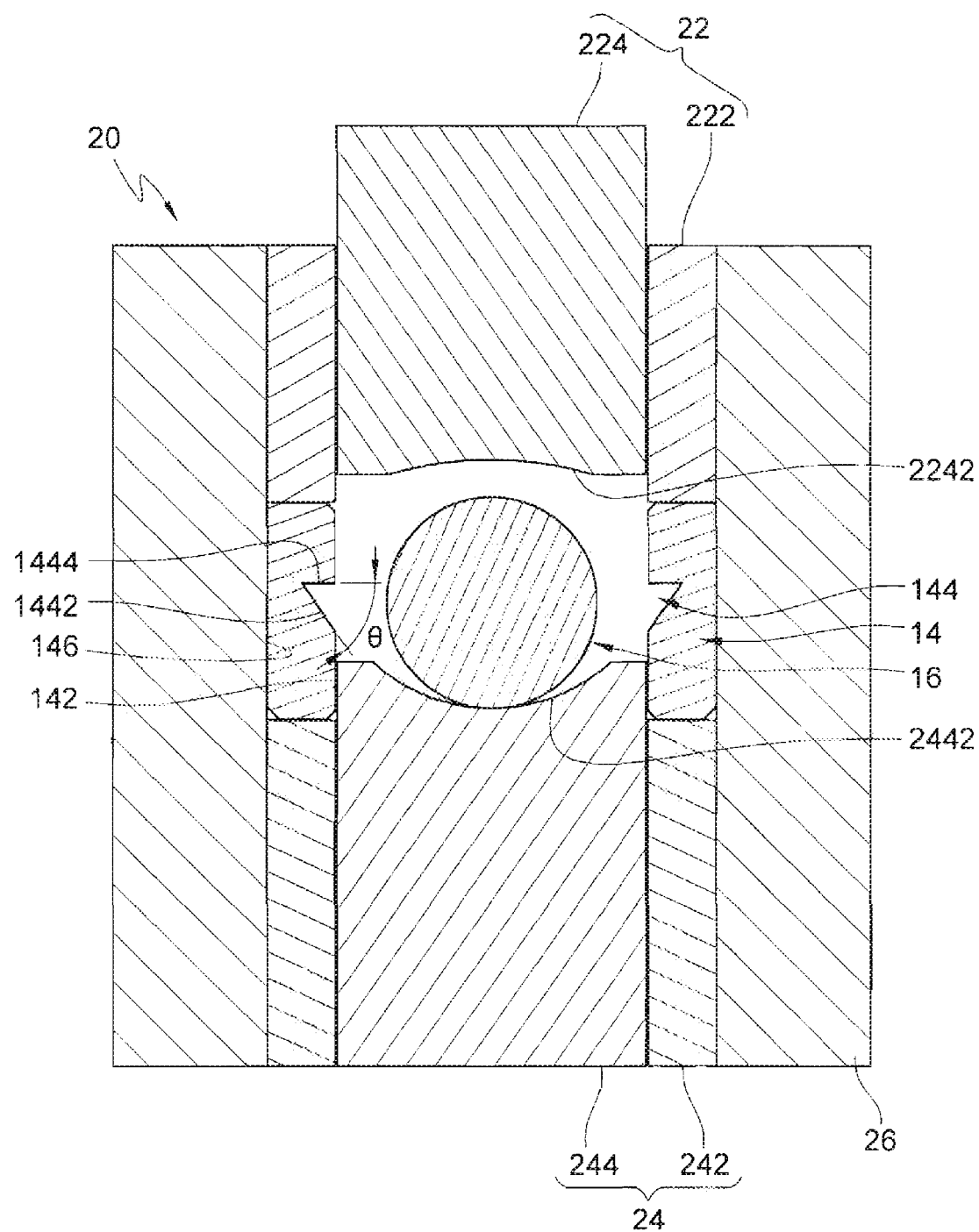
FIG. 1 is a schematic view of an operation according to an embodiment of the present invention.
Figure 2:
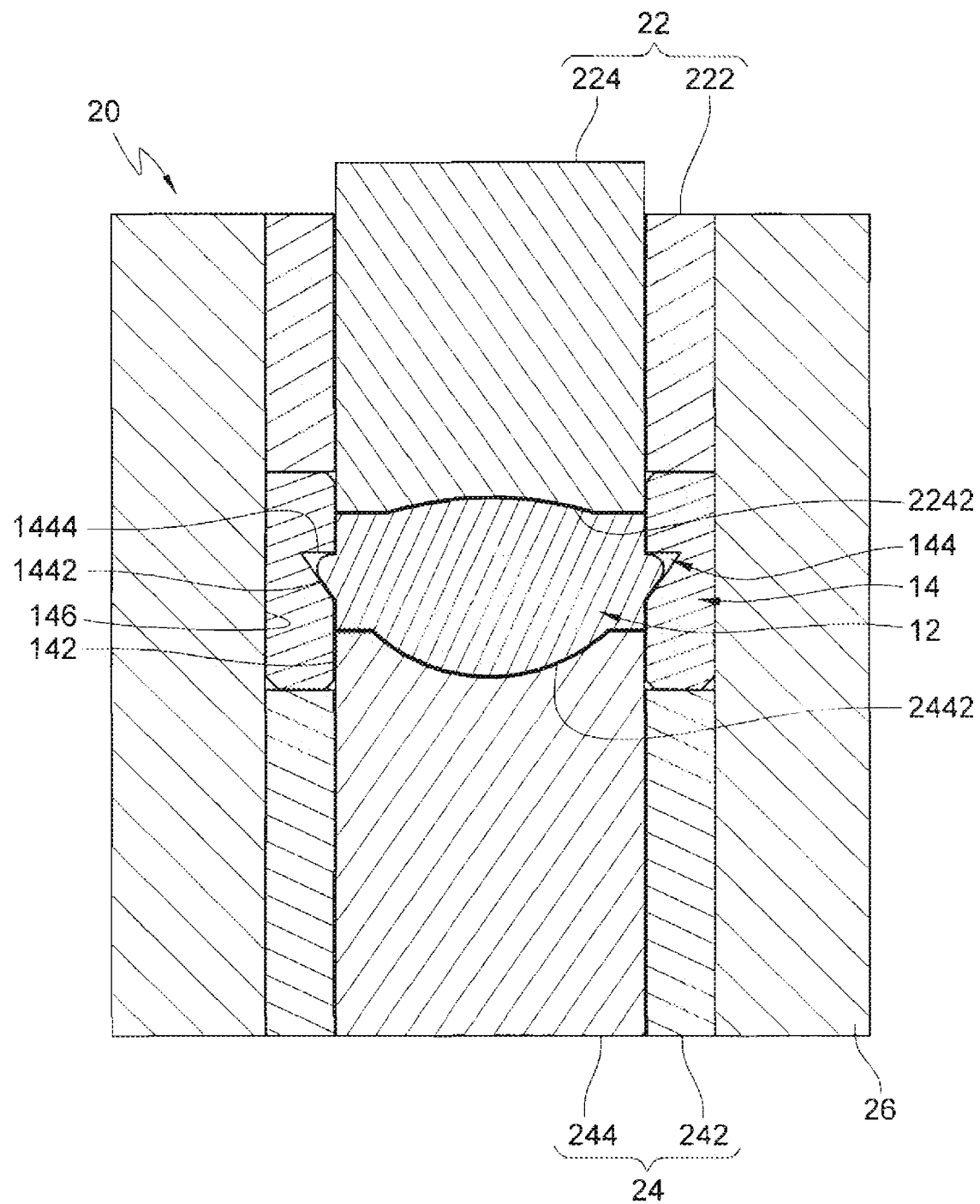
FIG. 2 is a schematic view of a molding according to an embodiment of the present invention.

Referring to FIGS. 1 and 2, when the optical element according to an embodiment of the present invention is manufactured, firstly a mold 20 is provided, and the mold 20 comprises an upper mold 22, a lower mold 24, and an outer mold 26. The outer mold 26 wraps two sides of the upper mold 22 and the lower mold 24. The upper mold 22 has an upper outer mold 222 and an upper inner mold 224. The lower mold 24 has a lower outer mold 242 and a lower inner mold 244 respectively corresponding to the upper outer mold 222 and the upper inner mold 224. The upper inner mold 224 and the lower inner mold 244 are disposed in a shape of a cylinder, and are able to respectively slide relative to the upper outer mold 222 and the lower outer mold 242. Meanwhile, an upper molding face 2242 and a lower molding face 2442 are respectively disposed on two opposite sides of the upper inner mold 224 and the lower inner mold 244, and a radius of curvature of the upper molding face 2242 is greater than the radius of curvature of the lower molding face 2442. The upper molding face 2242 and the lower molding face 2442 are respectively used to correspondingly form a second mirror 124 and a first mirror 122 of an optical lens 12, such that the radius of curvature of the first mirror 122 is smaller than the radius of curvature of the second mirror 124 (see FIG. 3A).

Next, a holder 14 is provided in the mold 20, the holder 14 is a hollow cylinder, whose material is aluminum, stainless steel or other metals, formed by cutting, punching, or casting, and is used to hold the optical lens 12, and position the optical lens 12 in an optical device (not shown). The holder 14 has an inner surface 142, a groove 144, and an outer surface 146, and the groove 144 surrounds the inner surface 142. The groove 144 has a guiding face 1442 and a carrying face 1444, the carrying face 1444 is perpendicular to the inner surface 142, the guiding face 1442 is obliquely disposed in a direction from the lower molding face 2442 of the lower inner mold 244 to the upper molding face 2242 of the upper inner mold 224 and from the inner surface 142 to the outer surface 146, that is, the guiding face 1442 is obliquely disposed in a direction from one side having the smaller radius of curvature to the other side having the greater radius of curvature and from the inner side to the outer side, and forms an oblique angle (θ) with the carrying face 1444. The oblique angle is between 45 degrees and 75 degrees, for example, 75 degrees, 60 degrees, 45 degrees, and other oblique angles.

Meanwhile, an outer diameter of the holder 14 corresponds to the outer diameters of the upper outer mold 222 and the lower outer mold 242 of the mold 20, and an inner diameter matches with the diameters of the upper inner mold 224 and the lower inner mold 244. Therefore, the holder 14 is sandwiched between and fixed by the upper outer mold 222 and the lower outer mold 242 in the mold 20, and the upper inner mold 224 and the lower inner mold 244 are able to slide in the holder 14.

Referring to FIGS. 1 and 2, an optical material 16 is placed in the holder 14, and corresponds to a position of the groove 144. A heater heats the mold 20 and the holder 14 (not shown), so as to provide a heat source for the holder 14 and the optical material 16, thereby softening the optical material 16. After being softened, the optical material 16 is pressed by the lower molding face 2442 and the upper molding face 2242 of the mold 20. The optical material 16 is pressed to flow and deform, so as to adhere to the inner surface 142 of the holder 14 and to form the optical lens 12 having the first mirror 122 and the second mirror 124 respectively corresponding to the lower molding face 2442 and the upper molding face 2242 (see FIG. 3A).

During the process, the radius of curvature of the upper molding face 2242 is greater than the radius of curvature of the lower molding face 2442, such that a flowing speed of one side of the optical material 16 pressed by the upper molding face 2242 is smaller than the flowing speed of the other side pressed by the lower molding face 2442. Through the characteristic, and together with the disposing manner that the guiding face 1442 of the groove 144 is obliquely disposed in the direction from the side having the smaller radius of curvature to the side having the greater radius of curvature and from the inner side to the outer side, after the optical material 16 is adhered to the inner surface 142 of the holder, the optical material 16 flows in the groove 144 along the guiding face 1442, is adhered to the guiding face 1442 and the carrying face 1444, and is stopped on the carrying face 1444. At this time, being sandwiched between the guiding face 1442 and the carrying face 1444 of the groove 144, the optical lens 12 formed by pressing the optical material 16 is limited and closely adhered to the holder 14, so as to form an optical element 10 with the optical lens 12 embedded in the holder 14 (see FIG. 3A).

Figure 3A:
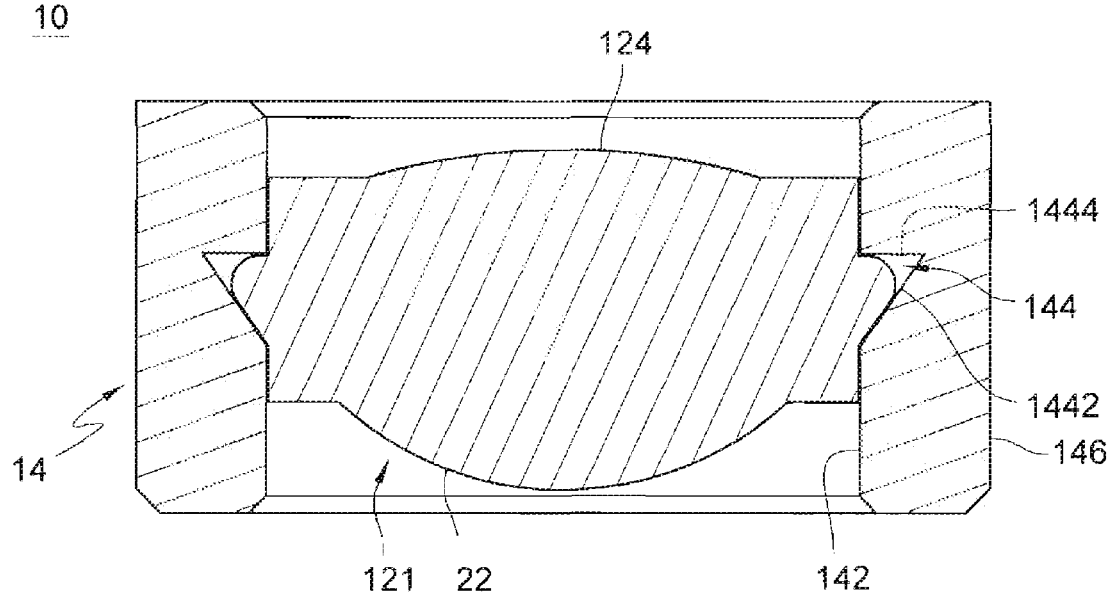
FIG. 3A is a schematic view of a structure having two convexes of an optical element according to the present invention.

In addition, referring to FIG. 3A, by reason of a calculation error of the volume, during the pressing process, the optical material 16 to be molded by pressing is guided by the guiding face 1442 to flow in the groove 144, and is stopped on the carrying face 1444, such that the volume error is absorbed by the groove 144, so a thickness of each molded optical lens 12, and the curvatures of the first mirror 122 and the second mirror 124 are maintained at stable values, thereby enhancing the precision and the yield of the finished product of the optical element 10, and reducing the production cost.

Figure 3B:
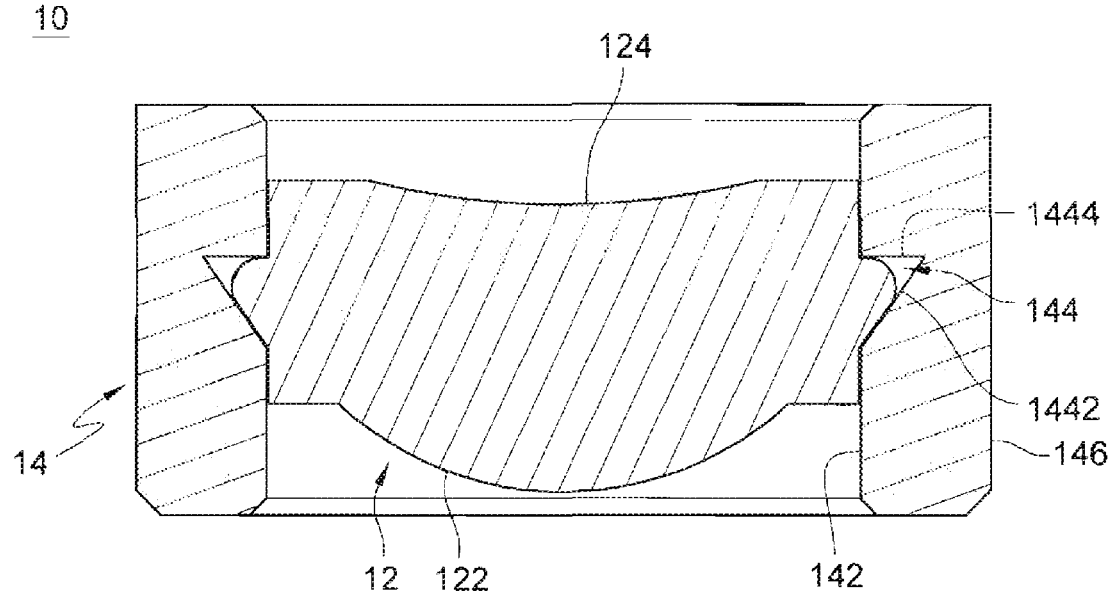
FIG. 3B is a schematic view of a structure having a concave and a convex of the optical element according to the present invention.
Figure 3C:
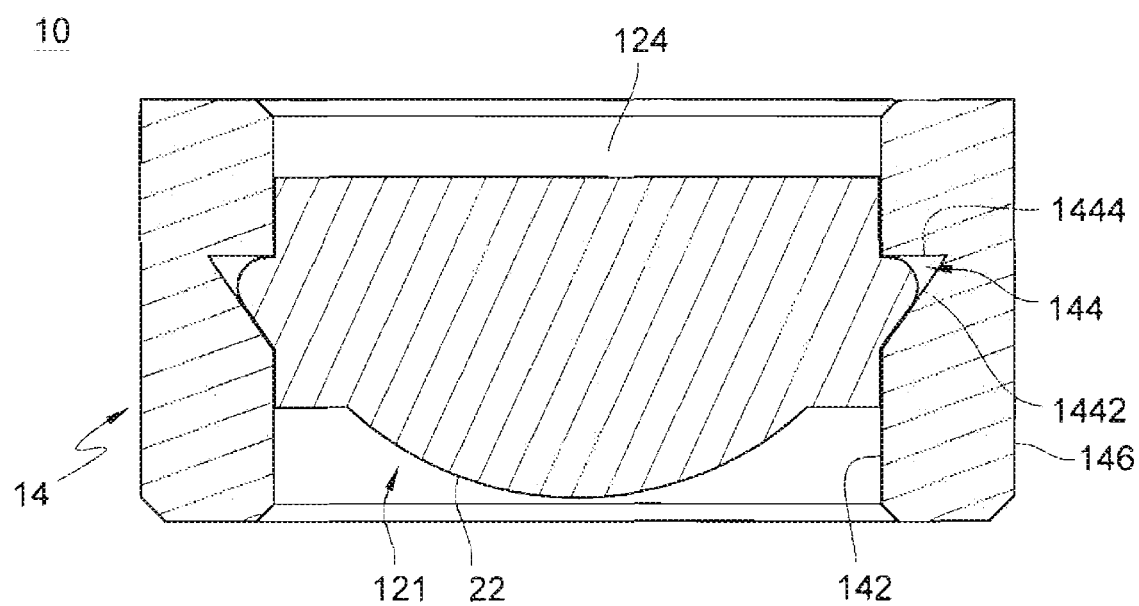
FIG. 3C is a schematic view of a structure having a plane and a convex of the optical element according to the present invention.

Referring to FIGS. 3A to 3C, schematic structural views of the optical element according to the embodiment of the present invention are shown. The optical element 10 according to the embodiment of the present invention comprises an optical lens 12 and a holder 14. The optical lens 12 is formed by the glass material, the optical lens 12 is embedded in the holder 14, and the optical lens 12 has a first mirror 122 and a second mirror 124, in which the radius of curvature of the first mirror 122 is smaller than the radius of curvature of the second mirror 124. Therefore, referring to FIG. 3A, the first mirror 122 and the second mirror 124 are disposed as convexes, alternatively, referring to FIG. 3B, the first mirror 122 is a convex, and the second mirror 124 is a concave, and referring to FIG. 3C, the first mirror 122 is a convex, and the second mirror 124 is a plane, which depends on the shape of the mold forming the first mirror 122 and the second mirror 124 during manufacturing.

Referring to FIG. 3A, the holder 14 has an inner surface 142, a groove 144, and an outer surface 146, and the groove 144 surrounds the inner surface 142. The optical lens 12 is adhered to the inner surface 142, is embedded in the groove 144, and is fixed in the holder 14. The groove 144 has a guiding face 1442 and a carrying face 1444, and the carrying face 1444 is perpendicular to the inner surface 142. The guiding face 1442 is obliquely disposed in the direction from the first mirror 122 of the optical lens 12 to the second mirror 124 and from the inner surface 142 to the outer surface 146, that is, the guiding face 1442 is obliquely disposed in the direction from one side having the smaller radius of curvature to the other side having the greater radius of curvature and from the inner side to the outer side, and forms an oblique angle ($\theta$) between 45 degrees and 75 degrees with the carrying face 1444.

The optical lens 12 is embedded in the groove 144, is adhered to the guiding face 1442 and the carrying face 1444 along the inner surface 142, and is stopped in the holder 14 through the carrying face 1444, such that the optical lens 12 is sandwiched between the guiding face 1442 and the carrying face 1444, and is limited in the holder 14. In addition, the guiding face 1442 may be obliquely disposed in the direction from the first mirror 122 to the second mirror 124 and from the inner surface 142 to the outer surface 146, such that similarly the guiding face 1442 forms an oblique angle with the carrying face 1444, so the optical lens 12 is sandwiched between the guiding face 1442 and the carrying face 1444 in the holder 14.

During the molding process, the optical lens 12 is guided by the guiding face 1442, flows in the groove 144, and is stopped on the carrying face 1444, such that the optical lens 12 is adhered to the inner surface 142 of the holder 14, and is closely adhered to the groove 144. Therefore, the guiding face 1442 may be disposed as a plane or a camber, such that the optical lens 12 is embedded in the groove 144. The guiding face 1442 and the carrying face 1444 of the groove 144 stably catch the optical lens 12 in the holder 14, and closely adhere the optical lens 12 to the holder 14, such that the optical element 10 having the optical lens 12 embedded in the holder 14 has the good gas tightness, and is applicable to the optical device required to preserve some kinds of special gas, such as elements of the laser diodes or the optic fibers.

In the optical element and the manufacturing method thereof of the present invention, when the optical material forms the optical lens, the radius of curvature of the upper molding face of the mold is greater than the radius of curvature of the lower molding face, such that the flowing speed of one side of the optical material formed by the lower molding face is greater than that of the other side formed by the upper molding face. The guiding face of the groove of the holder is obliquely disposed in the direction from the side having the smaller radius of curvature of the optical lens to the side having the greater radius of curvature of the optical lens and from the inner side of the holder to the outer side, so when the first mirror and the second mirror of the optical lens are formed, the optical material is guided by the guiding face to flow in the groove, and is stopped on the carrying face of the groove, thereby forming the optical element having the optical lens embedded in the holder In the optical element and the manufacturing method thereof of the present invention, through the disposing manner of the guiding face and the carrying face of the groove of the holder, the formed optical lens is closely adhered in the holder, thereby enhancing the gas tightness between the two. Further, the disposing manner of the groove may prevent the overflow or the shortage of the optical material by reason of the calculation error when the optical material is pressed. Meanwhile, the optical lens is directly formed in the holder, such that the production and the assembly costs are further reduced.

What is claimed is:

1. A method for manufacturing an optical element, comprising:

providing a mold, wherein the mold has a lower molding face and an upper molding face, and a radius of curvature of the lower molding face is smaller than a radius of curvature of the upper molding face;

providing a holder, wherein the holder has an outer surface, an inner surface, and at least one groove, the groove surrounds the inner surface, and the groove has a guiding face and a carrying face, the guiding face is obliquely disposed in a direction from the lower molding face to the upper molding face and from the inner surface of the holder to the outer surface, and the carrying face is perpendicular to the inner surface, and forms an oblique angle with the guiding face;

placing an optical material in the holder, wherein a placing position of the optical material corresponds to the groove; and softening the optical material, and pressing the optical material by the lower molding face and the upper molding face of the mold, such that the optical material is adhered to the inner surface of the holder, is guided by the guiding face to be embedded in the groove, and is stopped on the carrying face, meanwhile, the optical material forms an optical lens having a first mirror and a second mirror.

2. The method for manufacturing an optical element according to claim 1, wherein in the step of softening the optical material, the mold, the holder, and the optical material are heated, so as to soften the optical material.

3. The method for manufacturing an optical element according to claim 1, wherein the oblique angle is 45-75 degrees.

4. The method for manufacturing an optical element according to claim 3, wherein the oblique angle is 75 degrees.

5. The method for manufacturing an optical element according to claim 1, wherein the guiding face of the holder is a plane.

6. The method for manufacturing an optical element according to claim 1, wherein the guiding face of the holder is a camber.

7. The method for manufacturing an optical element according to claim 1, wherein the lower molding face and the upper molding face are concaves, such that the first mirror and the second mirror are respectively formed as a convex.

8. The method for manufacturing an optical element according to claim 1, wherein the lower molding face is a concave and the upper molding face is a convex, such that the first mirror is formed as a convex and the second mirror is formed as a concave.

9. The method for manufacturing an optical element according to claim 1, wherein the lower molding face is a concave and the upper molding face is a plane, such that the first mirror is formed as a convex and the second mirror is formed as a plane.

10. The method for manufacturing an optical element according to claim 1, wherein the optical material is glass.

11. An optical element, comprising:
  an optical lens, having a first mirror and a second mirror, wherein a radius of curvature of the first mirror is smaller than a radius of curvature of the second mirror; and
  a holder, having an outer surface, an inner surface, and at least one groove, wherein the groove surrounds the inner surface, the optical lens is adhered to the inner surface, embedded in the groove, and fixed in the holder, the groove has a guiding face and a carrying face, the guiding face is obliquely disposed in a direction from the first mirror to the second mirror and from the inner surface of the holder to the outer surface, and the carrying face is perpendicular to the inner surface, and forms an oblique angle with the guiding face.

12. The optical element according to claim 11, wherein the oblique angle is 45-75 degrees.

13. The optical element according to claim 12, wherein the oblique angle is 75 degrees.

14. The optical element according to claim 11, wherein the guiding face of the holder is a plane.

15. The optical element according to claim 11, wherein the guiding face of the holder is a camber.

16. The optical element according to claim 11, wherein the first mirror and the second mirror are convexes.

17. The optical element according to claim 11, wherein the first mirror is a convex, and the second mirror is a concave.

18. The optical element according to claim 11, wherein the first mirror is a convex, and the second mirror is a plane.

19. The optical element according to claim 11, wherein the optical element is applied to a laser diode or an optic fiber.

\* \* \* \* \*